(12) United States Patent
Chiang et al.

(10) Patent No.: US 12,372,821 B2
(45) Date of Patent: Jul. 29, 2025

(54) VEHICLE DISPLAY DEVICE WITH REDUCED WINDOW GLARE

(71) Applicant: Atieva, Inc., Newark, CA (US)

(72) Inventors: Richard Chiang, Newark, CA (US); Lucas Jungmann, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/561,603

(22) PCT Filed: May 16, 2022

(86) PCT No.: PCT/US2022/072349
§ 371 (c)(1),
(2) Date: Nov. 16, 2023

(87) PCT Pub. No.: WO2022/246390
PCT Pub. Date: Nov. 24, 2022

(65) Prior Publication Data
US 2024/0241399 A1 Jul. 18, 2024

Related U.S. Application Data

(60) Provisional application No. 63/201,871, filed on May 17, 2021.

(51) Int. Cl.
*G02F 1/1333* (2006.01)
*B60K 35/22* (2024.01)
*B60K 35/90* (2024.01)

(52) U.S. Cl.
CPC .... *G02F 1/133331* (2021.01); *G02F 1/13336* (2013.01); *B60K 35/22* (2024.01);
(Continued)

(58) Field of Classification Search
None
See application file for complete search history.

(56) References Cited

U.S. PATENT DOCUMENTS

2003/0210535 A1 11/2003 Gaides
2009/0015540 A1 1/2009 Suzuki
(Continued)

FOREIGN PATENT DOCUMENTS

| DE | 202018002037 U1 | 5/2018 |
|---|---|---|
| JP | 2005189096 A | 7/2005 |
| WO | 2020124564 A1 | 6/2020 |

OTHER PUBLICATIONS

International Search Report and Written Opinion for PCT Application No. PCT/US2022/072349, mailed on Sep. 19, 2022, 9 pages.
(Continued)

*Primary Examiner* — Richard H Kim
(74) *Attorney, Agent, or Firm* — Brake Hughes Bellermann LLP

(57) ABSTRACT

A vehicle display device comprises: a housing forming an opening to an interior; a first display module positioned in the interior of the housing, the display module including a first louver film that is stacked with a second louver film, wherein respective orientations of the first and second louver films are substantially perpendicular to each other; and a cover glass that covers the opening to the interior of the housing, the cover glass being free floating and having an exposed glass edge; wherein the vehicle display device has a shroud-less design and is configured for positioning within a distance from a vehicle window where the display module is susceptible to generating a reflection in the vehicle window, and wherein at least one of the first and second louver films reduce the reflection.

20 Claims, 7 Drawing Sheets

(52) U.S. Cl.
CPC ........ *B60K 35/90* (2024.01); *B60K 2360/349* (2024.01); *G02F 2201/38* (2013.01)

(56) References Cited

U.S. PATENT DOCUMENTS

| | | | |
|---|---|---|---|
| 2014/0232969 A1* | 8/2014 | Tsubaki | G02F 1/133308 |
| | | | 156/305 |
| 2015/0151676 A1 | 6/2015 | Birman et al. | |
| 2020/0277222 A1 | 9/2020 | Inoue et al. | |
| 2021/0397041 A1* | 12/2021 | Kashiwagi | G02F 1/133607 |
| 2022/0197582 A1* | 6/2022 | Yokoi | G09F 9/40 |
| 2023/0084709 A1* | 3/2023 | Nishimoto | G02F 1/133308 |
| | | | 349/56 |

OTHER PUBLICATIONS

Extended European Search Report for European Application No. 22805693.3, mailed Feb. 24, 2025, 8 pages.

\* cited by examiner

VEHICLE DISPLAY DEVICE WITH REDUCED WINDOW GLARE

CROSS-REFERENCE TO RELATED APPLICATION

This application is a 35 U.S.C. § 371 National Phase Entry Application from PCT Application No. PCT/US2022/072349, filed on May 16, 2022, entitled "VEHICLE DISPLAY DEVICE WITH REDUCED WINDOW GLARE", and designating the U.S., which in turn claims priority to U.S. Patent Application No. 63/201,871, filed on May 17, 2021, and entitled "VEHICLE DISPLAY DEVICE WITH REDUCED WINDOW GLARE," the disclosures of which are incorporated by reference herein in their entireties.

TECHNICAL FIELD

This document relates to a vehicle display device with reduced window glare.

BACKGROUND

Electronic displays in automobiles are typically placed in front of the occupant line of sight for ease of viewing and interaction. Electronic displays can be passive display devices or have touchscreen technology for an occupant to interact with the display. Electronic displays are usually positioned sufficiently far from vehicle windows that reflections are not a problem. For example, display devices having a shrouded design can be mounted flush with the dashboard, some of them recessed therein, such that little or no display light reaches the window and can cause reflections.

SUMMARY

In a first aspect, a vehicle display device comprises: a housing forming an opening to an interior; a first display module positioned in the interior of the housing, the display module including a first louver film that is stacked with a second louver film, wherein respective orientations of the first and second louver films are substantially perpendicular to each other; and a cover glass that covers the opening to the interior of the housing, the cover glass being free floating and having an exposed glass edge; wherein the vehicle display device has a shroud-less design and is configured for positioning within a distance from a vehicle window where the display module is susceptible to generating a reflection in the vehicle window, and wherein at least one of the first and second louver films reduce the reflection.

Implementations can include any or all of the following features. The vehicle display device includes multiple display modules. The first display module is positioned nearest the vehicle window of the multiple display modules. The multiple display modules include the first display module and second and third display modules, the first, second, and third display modules oriented side by side horizontally within the vehicle display device. A second display module of the multiple display modules includes the first louver film and does not include the second louver film. The first display module has first calibration settings and wherein the second display module has second calibration settings, wherein the first calibration settings are different from the second calibration settings. The first calibration settings compensate brightness and color of the first display device compared to the second display device. The vehicle window is a driver side window. One of the first and second louver films is a vertical louver film. The first display module includes a backlight module, and wherein the first and second louver films are included in the backlight module. The backlight module includes a liquid crystal display (LCD) module and a light guide module, and wherein the first and second louver films are placed between the LCD module and the light guide module. The vehicle display device further comprises a second display module that includes a first louver film and that does not include a second louver film substantially perpendicular to the first louver film. The first display module has first calibration settings and wherein the second display module has second calibration settings, wherein the first calibration settings are different from the second calibration settings. The first calibration settings compensate brightness and color of the first display device compared to the second display device.

In a second aspect, a vehicle display device comprises: a housing forming an opening to an interior; a first display module positioned in the interior of the housing; a cover glass that covers the opening to the interior of the housing, the cover glass being free floating and having an exposed glass edge, wherein the vehicle display device has a shroudless design, wherein the vehicle display device is configured for positioning within a distance from a side vehicle window where the display module is susceptible to generating a reflection in the side vehicle window, and wherein the vehicle display device is configured for positioning within a distance from a windshield where the display module is susceptible to generating a reflection in the windshield; and means for reducing the reflection in the side vehicle window and the reflection in the windshield.

BRIEF DESCRIPTION OF DRAWINGS

Like reference symbols in the various drawings indicate like elements.

DETAILED DESCRIPTION

Figure 1:
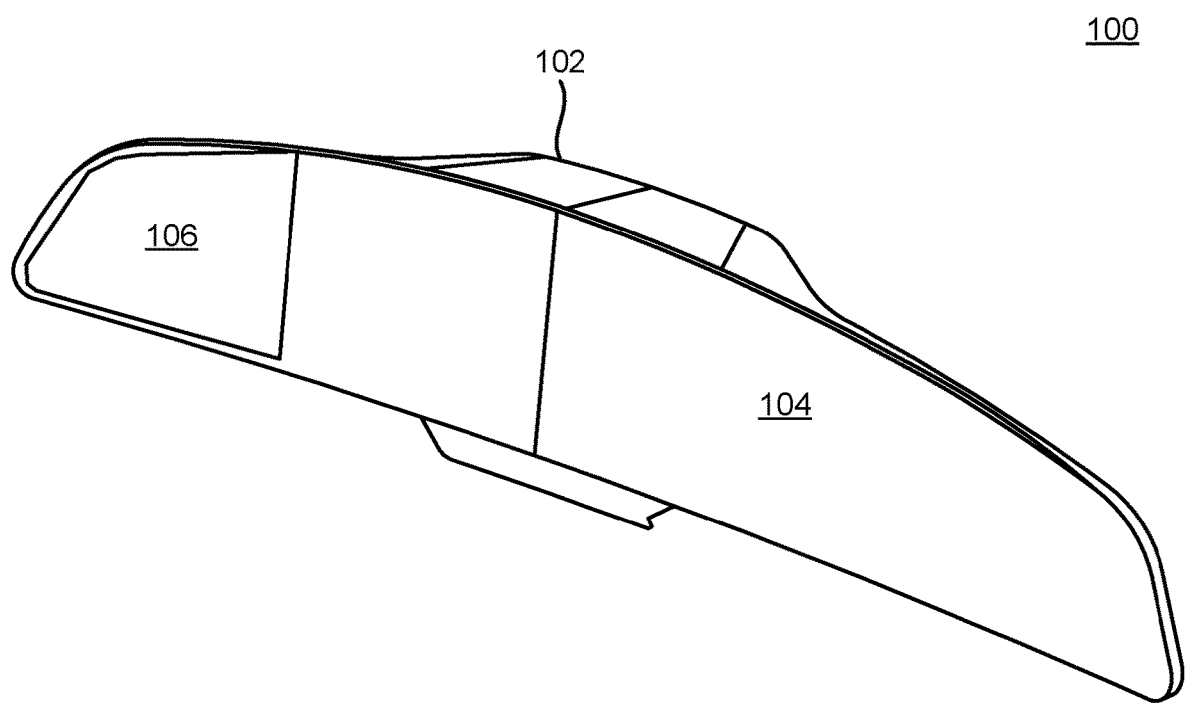
FIG. 1 shows a perspective view of a front of an example of a display device for a vehicle.

This document describes examples of systems and techniques for providing a vehicle display device with reduced window glare.

Examples herein refer to a louver film. As used herein, a louver film includes a substrate configured for restricting the transmission of light in one direction. As used herein, a vertical louver film restricts transmission of light to vertical directions, and a horizontal louver film restricts transmission of light to horizontal directions. For example, a louver film can also be known as a light control film.

Examples herein refer to a substrate being transparent. As used herein, being transparent is used substantially synonymously with being optically clear. As used herein, a substrate (such as a protective film or a cover glass) is transparent if it has a transmittance within at least part of the visible-light spectrum of at least about 80%. In some implementations, a substrate can be considered transparent if it has a transmittance within most of the visible-light spectrum of at least about 80%.

Examples herein refer to a display device having a cover glass. As used herein, a cover glass is a transparent substrate. A transparent substrate can be made of, but is not limited to, a glass material. For example, a cover glass can be made from chemically strengthened glass. A cover glass can be planar or non-planar. For example, a cover glass can have a curved shape. A cover glass can be compatible with use of touchscreen technology for allowing a user to make inputs using the cover glass, wherein content is visually presented at the cover glass. In some implementations, the cover glass can facilitate use of capacitive and/or resistive touch sensing, to name just two examples.

Examples herein refer to an adhesive used with one or more components of a vehicle display device. As used herein, an adhesive is compatible with the environmental conditions that can occur within vehicles in different situations around the world. In some implementations, the adhesive can be capable of withstanding the environmental testing conditions that may apply to vehicles in one or more geographic regions. Such conditions can relate to durability or performance under different aspects such as temperature ranges, humidity ranges, or exposure to sunlight, to name just a few examples.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle.

Examples herein refer to a front, rear, top or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows a perspective view of a front of an example of a display device 100 for a vehicle. The display device 100 or any component thereof can be used with one or more other examples described elsewhere herein. In some implementations, the display device 100 can be part of a dashboard of a vehicle. For example, the display device 100 can provide a user interface to an occupant of the vehicle, such as in form of an instrument cluster.

The display device 100 includes a housing 102 and a cover glass 104. The housing 102 can form an opening (not visible) into an interior space. The interior space can accommodate components such as one or more display modules. The housing 102 can be configured for mounting the display device 100 to structure in the vehicle. In some implementations, the housing 102 can provide that the display device 100 is positioned in front of and/or above the dashboard so as to be easy to see and reach. For example, this provides the display device 100 with a shroud-less design where the display device 100 is not embedded within or otherwise covered by parts of the dashboard.

The cover glass 104 is positioned at the opening into the interior of the housing 102. The cover glass 104 can provide a view of content presented by one or more display modules within the housing 102. In some implementations, the cover glass 104 facilitates one or more types of user input by way of touchscreen technology.

The display device 100 can be configured for reducing glare in vehicle windows regarding some or all of its visible display area. In some implementations, at least a region 106, here indicated at the cover glass 104, can feature improved reduction of reflections from nearby vehicle windows. For example, the improved reflection reduction can be implemented because the region 106 is situated nearest a side window of the vehicle, wherein the region 106 is susceptible to generating reflections in the side window.

Figure 2:
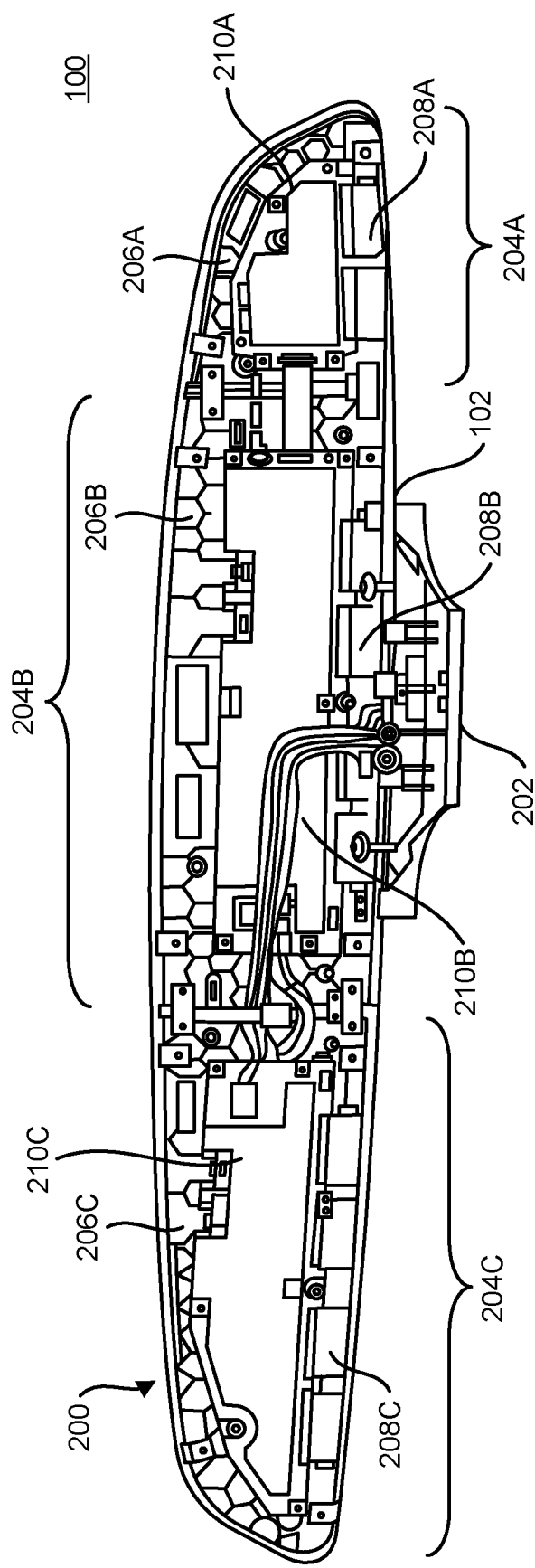
FIG. 2 shows a perspective view of an interior of the display device of FIG. 1.

FIG. 2 shows a perspective view of a rear of the display device 100 of FIG. 1. Here, an interior 200 of the display device 100 is visible. The housing 102 can include a removable cover covering the interior 200 which is here omitted for visibility. The housing 102 can include a connection portion 202. In some implementations, the connection portion 202 can facilitate mounting of the display device 100 onto some structure (e.g., a dashboard), and communication between other components elsewhere in the vehicle and the display module and/or a touchscreen component. For example, the connection portion 202 can facilitate installation at the dashboard of a display device having a shroud-less design, such as the display device 100.

The display device 100 can include one or more display modules. Here, the display device 100 includes display modules 204A-204C, respectively. The display modules 204A-204C can be oriented in any of multiple configurations. Here, the display modules 204A-204C are arranged side by side horizontally within the display device 100. For example, from the perspective of an occupant, the display module 204A can be referred to as a left display module, the display module 204B can be referred to as a center display module, and the display module 204C can be referred to as a right display module. That is, in a left-side drive vehicle, the display module 204A can be situated nearest the driver side window of the display modules 204A-204C.

Each of the display modules 204A-204C can include electronic components and other devices for its operation. Here, the display module 204A includes a backlight module 206A with light-emitting diodes (LEDs) 208A, and also a circuit board 210A. The display module 204B includes a backlight module 206B with LEDs 208B, and also a circuit board 210B. The display module 204C includes a backlight module 206C with LEDs 208C, and also a circuit board 210C. One or more of the display modules 204A-204C can feature improved reduction or prevention of glare or other reflections from vehicle windows. In some implementations, one or more of the backlight modules 206A-206C can include an improved architecture which can reduce or eliminate certain reflections that would otherwise be caused by the corresponding one of the display modules 204A-204C. For example, when the backlight module 206A of the display module 204A has the improved architecture, this can provide the region 106 (FIG. 1) reduction or prevention of glare or other reflections from vehicle windows. This can be particularly advantageous when the display device 100 has a shroud-less design, where the cover glass 104 (FIG. 1) may be free floating and have an exposed glass edge, and wherein the region 106 is positioned particularly close to a side window such that reflections in the side window could be distracting or noticeable to an occupant (e.g., the driver of the vehicle).

Figure 3:
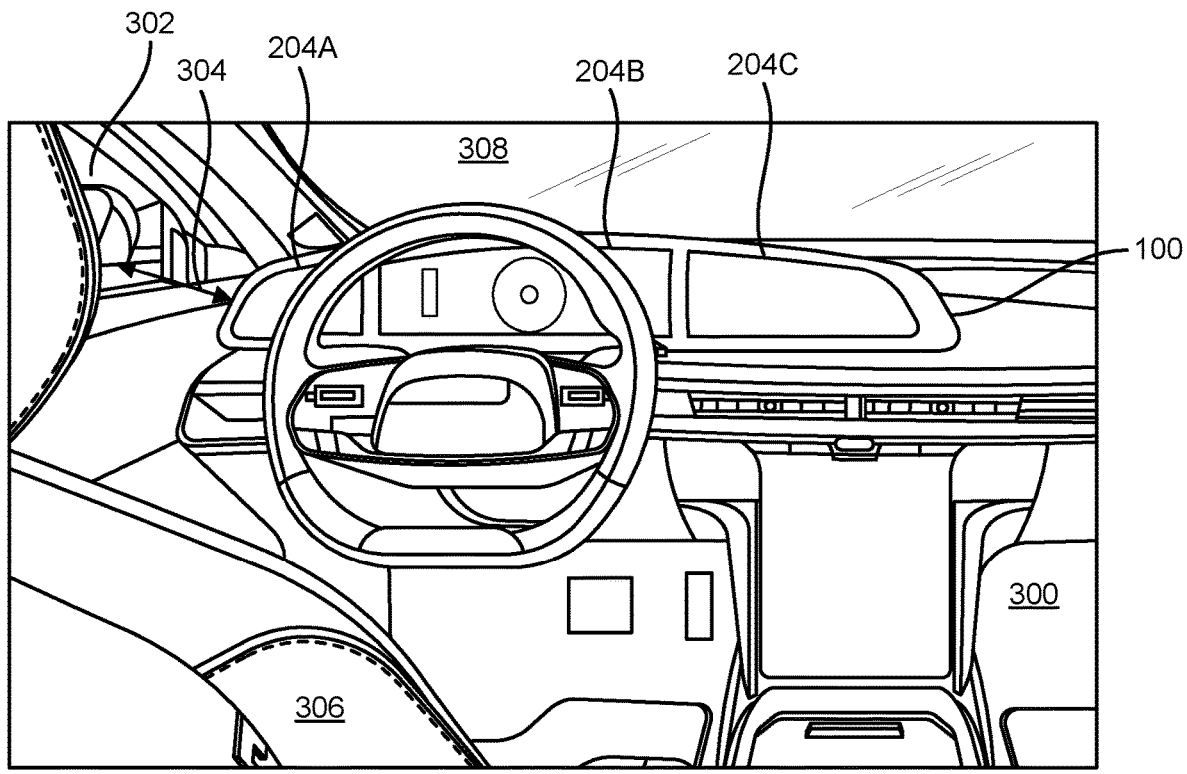
FIG. 3 shows an example of the display device of FIG. 1 installed in a passenger compartment of a vehicle.

FIG. 3 shows an example of the display device 100 of FIG. 1 installed in a passenger compartment 300 of a vehicle. Here, the display module 204A is positioned closest to a side window 302 of the display modules within the display device 100. For example, a distance 304 between the display module 204A and the side window 302 can be such that light from the display module 204A may reflect at the side window 302 and reach an occupant in a seat 306. In some implementations, the display device 100 can be provided with improved glare protection that reduces or prevents reflections of the display device 100 in the side window 302 while preserving full usability of the display device 100 and ensuring a consistent appearance and behavior among the display modules 204A-204C.

Some or all of the display modules 204A-204C can be susceptible to generating a reflection in a windshield 308. In some implementations, such one(s) of the display modules 204A-204C can have protection that reduces or eliminates such windshield reflections.

Figure 4:
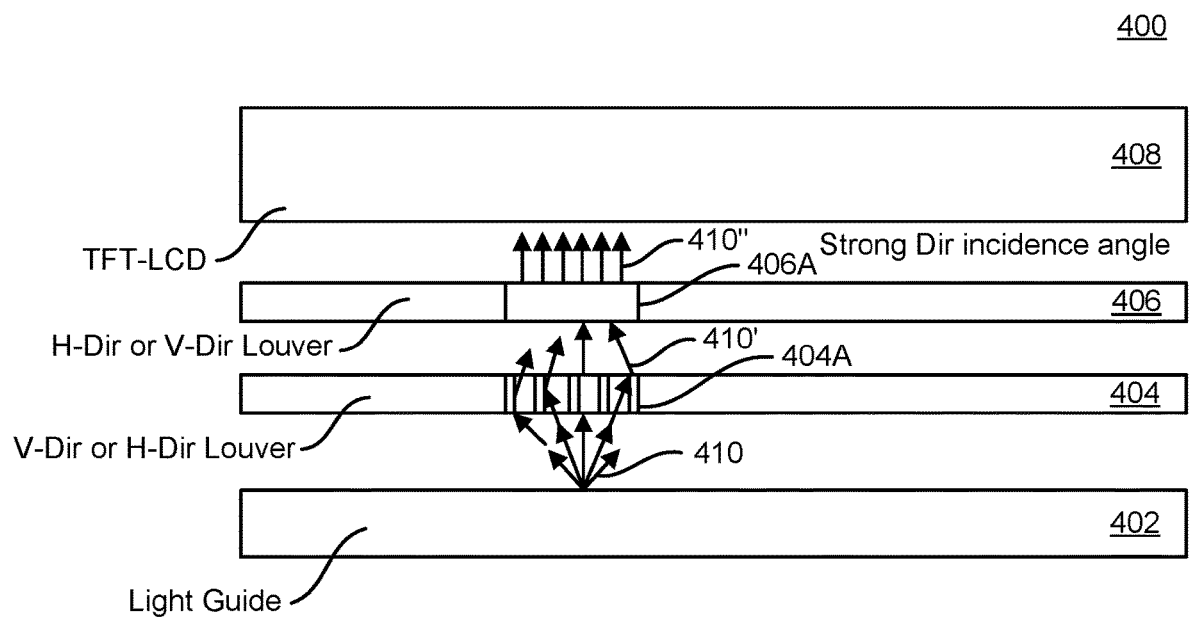
FIG. 4 shows an example of a backlight module that can be used for one or more of the display modules of the display device of FIG. 1.

FIG. 4 shows an example of a backlight module 400 that can be used for one or more of the display modules 204A-204C of the display device 100 of FIG. 1. The backlight module 400 or any component thereof can be used with one or more other examples described elsewhere herein.

The backlight module 400 can include a light guide module 402. In some implementations, the light guide module includes any of the LEDs 208A-208C (FIG. 2), configured to emit light into a transparent substrate (e.g., a light guide).

The backlight module 400 can include a louver film 404. The louver film 404 can include an optical substrate to restrict light from the backlight module 400 in one direction. For example, the louver film 404 can be a vertical louver film or a horizontal louver film.

The backlight module 400 can include a louver film 406 that is stacked with the louver film 404. The louver film 406 can include an optical substrate to restrict light from the backlight module 400 in one direction. In some implementations, the orientations of the louver films 404 and 406 are substantially perpendicular to each other. For example, the louver film 406 can be a horizontal louver film (when the louver film 404 is a vertical louver film) or a vertical louver film (when the louver film 404 is a horizontal louver film).

The backlight module 400 can include a liquid crystal display (LCD) module 408. The LCD module 408 can operate according to any of multiple LCD techniques. In some implementations, the LCD module 408 can include a thin-film transistor (TFT) layer that serves as the pixels of the display device having the backlight module 400. The image pixels formed by the LCD module 408 are transmitted through a cover glass to be visible to a user.

Here, the louver film 404 includes louvers 404A (five of which are shown, as an example), and the louver film 406 includes louvers 406A (only one of which is shown, as an example). Light 410 transmitted by the light guide module 402 can propagate in a relatively great range of directions toward the louver film 404. Light 410' transmitted by the louver film 404 can propagate in a restricted range of directions toward the louver film 406. Light 410" transmitted by the louver film 406 can propagate in a further restricted range of directions toward the LCD module 408.

The light 410" can have a strong direction incidence angle with regard to the LCD module 408. For example, this can provide good control of the viewing angle, such as to restrict or reduce glare from side windows.

The backlight module 400 can be calibrated in one or more ways. In some implementations, the brightness and/or color shifting can be controlled. For example, brightness can be controlled by way of pulse width modulation regarding the power of the LEDs 208A-208C (FIG. 2). As another example, color can be controlled by way of a timing controller to adjust a gamma curve of the LCD module 408. For a given display device, brightness and color can be subject to specification by a manufacturer, and the calibration can adjust the backlight module 400 to conform to such specification(s).

Figure 5:
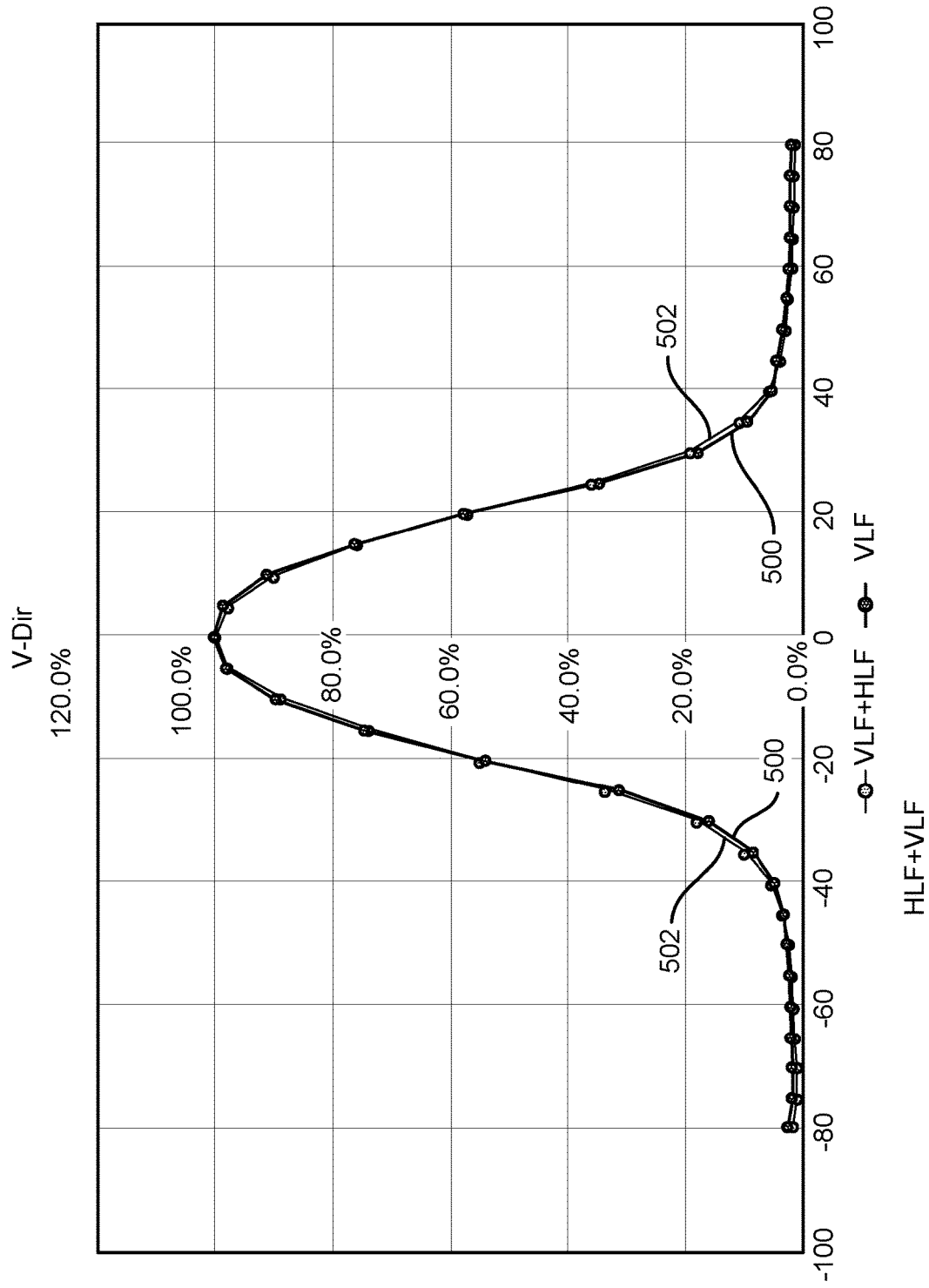
FIG. 5 shows examples of graphs regarding transmission of light in a vertical direction.

FIG. 5 shows examples of graphs 500 and 502 regarding transmission of light in a vertical direction. The examples described with regard to the graphs 500 and 502 can be applicable to the display device 100 (e.g., FIG. 1) or other examples described elsewhere herein. The graphs 500 and 502 illustrate that adding a horizontal louver film does not change the transmission of light in a vertical direction from a vertical louver film.

The graphs 500 and 502 indicate relative light intensity (e.g., brightness) along a vertical axis as a function of transmission angle indicated along a horizontal axis. The graphs 500 and 502 range between about −80 degrees and about 80 degrees, and between about zero and about 100%. Zero degrees transmission angle corresponds to the photometer being positioned normal to the surface of the display. Positive transmission angles correspond to looking down at the display, and negative transmission angles correspond to looking up at the display.

The graph 500 corresponds to the use of a vertical louver film but no horizontal louver film. The backlight module 400 in FIG. 4 can then include one of the louver films 404 or 406 but not the other. In some implementations, this architecture can be applied to either or both of the display modules 204B-204C. In some implementations, display modules that are not susceptible to generating a reflection in a side vehicle window can have protection against generating a glare in a vehicle windshield. For example, this can involve vertically restricting the transmitted light to avoid reflections in the windshield.

The graph 502 corresponds to the use of a vertical louver film and a horizontal louver film. For example, the backlight module 400 in FIG. 4 can then include both the louver films 404 and 406. The graphs 500 and 502 indicate that the light distribution of the graph 502 is substantially identical to the one of the graph 500. That is, using two perpendicularly oriented louver films does not adversely affect or otherwise alter the outcome in the vertical direction compared to using only a single louver film.

Figure 6:
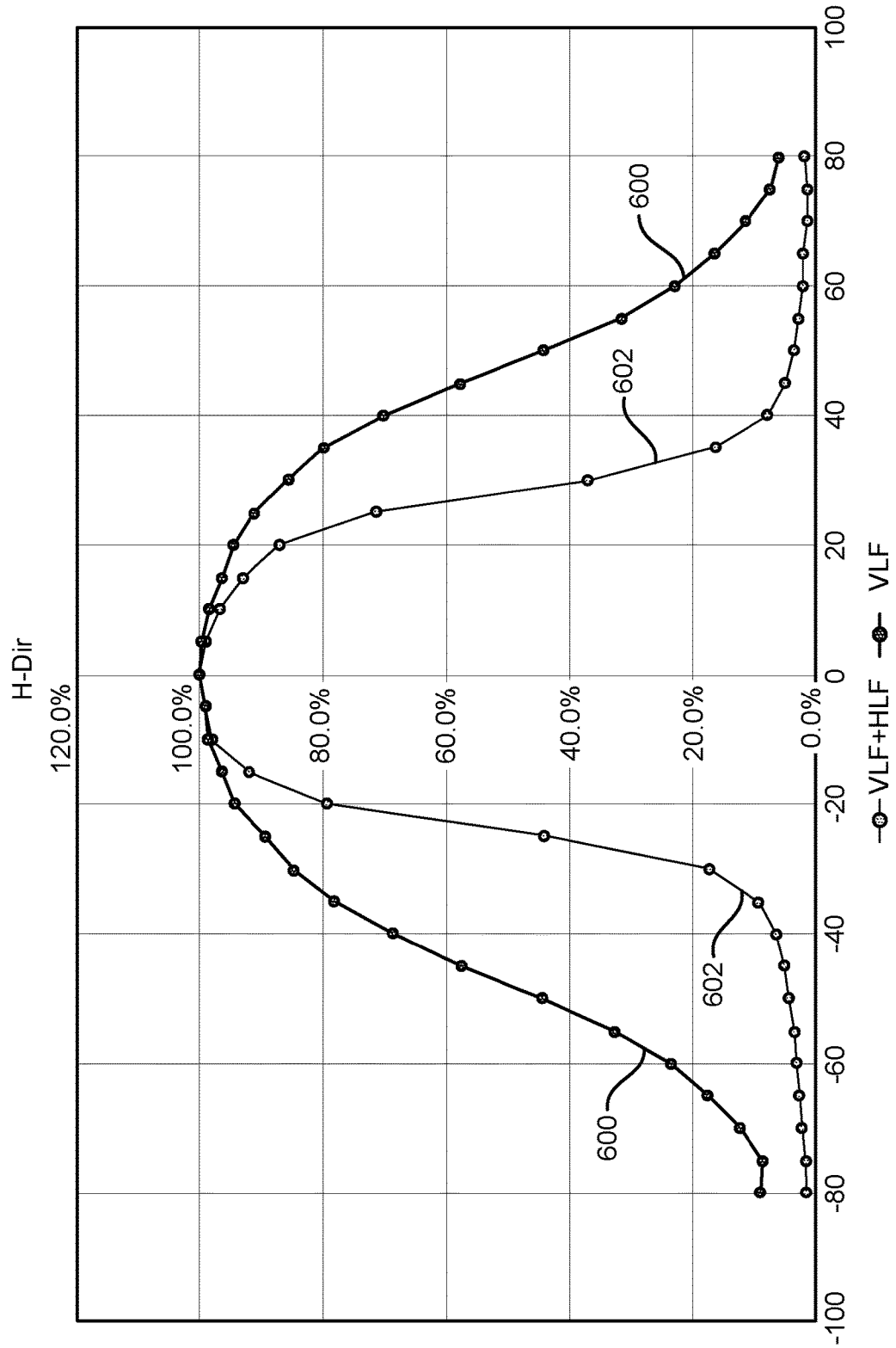
FIG. 6 shows examples of graphs regarding transmission of light in a horizontal direction.

FIG. 6 shows examples of graphs 600 and 602 regarding transmission of light in a horizontal direction. The examples described with regard to the graphs 600 and 602 can be applicable to the display device 100 (e.g., FIG. 1) or other examples described elsewhere herein. The graphs 600 and 602 illustrate that adding a horizontal louver film advantageously changes the transmission of light in a horizontal direction from a vertical louver film.

The graphs 600 and 602 indicate relative light intensity (e.g., brightness) along a vertical axis as a function of transmission angle indicated along a horizontal axis. The graphs 600 and 602 range between about −80 degrees and about 80 degrees, and between about zero and about 100%. Zero degrees transmission angle corresponds to the photometer being positioned normal to the surface of the display. Positive transmission angles correspond to looking at the display from the right, and negative transmission angles correspond to looking at the display from the left.

The graph 600 corresponds to the use of a vertical louver film but no horizontal louver film. The backlight module 400 in FIG. 4 can then include one of the louver films 404 or 406 but not the other. In some implementations, this architecture can be applied to either or both of the display modules 204B-204C. In some implementations, display modules that are not susceptible to generating a reflection in a side vehicle window can have protection against generating a glare in a vehicle windshield. For example, this can involve vertically restricting the transmitted light to avoid reflections in the windshield.

The graph 602 corresponds to the use of a vertical louver film and a horizontal louver film. For example, the backlight module 400 in FIG. 4 can then include both the louver films 404 and 406. The graphs 600 and 602 indicate that the light distribution of the graph 602 is different from the one of the graph 600. The graph 602 restricts the transmission of light in horizontal directions to a narrower field centered about the origin. That is, using two perpendicularly oriented louver films can reduce or eliminate reflections that would otherwise appear in a side window, compared to using only a single louver film.

Referring now to all drawings, the display device 100 can have the display modules 204A-204C arranged side-by-side horizontally with regard to each other. The cover glass 104 can be curved and be free floating with an exposed glass edge. The display device 100 can have a shroud-less design and be designed to be mounted distant to (e.g., not embedded into) a dashboard of the vehicle. The display module 204A can be situated near a side window where it is susceptible to generating window reflections. The display module 204A can include louver film layers within its backlight module that are oriented perpendicularly to each other so as to reduce reflections from the side window. The brightness and color of the display modules 204A-204C can be calibrated to each fall within a design specification. In some implementations, this can involve adjusting calibration settings of the display module 204A different from the calibration settings of the display modules 204B-204C. This can allow the display module 204A to compensate its brightness and color compared to the display modules 204B-204C. For example, this can provide the display device 100 with consistent and visually coherent appearance.

Figure 7:
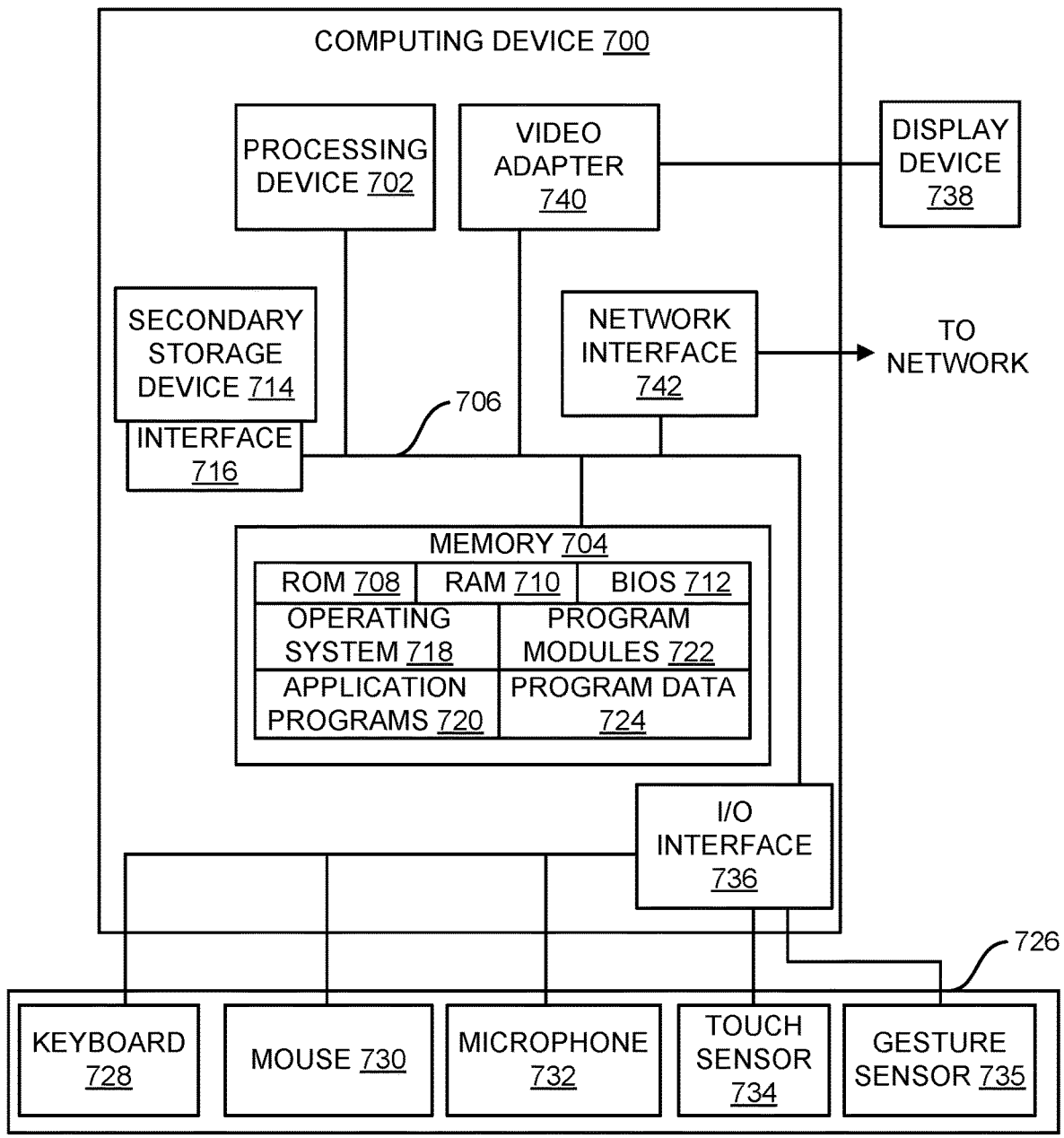
FIG. 7 illustrates an example architecture of a computing device that can be used to implement aspects of the present disclosure.

FIG. 7 illustrates an example architecture of a computing device 700 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 7 can be used to execute the operating system, application programs, and/or software modules (including the software engines) described herein.

The computing device 700 includes, in some embodiments, at least one processing device 702 (e.g., a processor), such as a central processing unit (CPU). A variety of processing devices are available from a variety of manufacturers, for example, Intel or Advanced Micro Devices. In this example, the computing device 700 also includes a system memory 704, and a system bus 706 that couples various system components including the system memory 704 to the processing device 702. The system bus 706 is one of any number of types of bus structures that can be used, including, but not limited to, a memory bus, or memory controller; a peripheral bus; and a local bus using any of a variety of bus architectures.

Examples of computing devices that can be implemented using the computing device 700 include a desktop computer, a laptop computer, a tablet computer, a mobile computing device (such as a smart phone, a touchpad mobile digital device, or other mobile devices), or other devices configured to process digital instructions.

The system memory 704 includes read only memory 708 and random access memory 710. A basic input/output system 712 containing the basic routines that act to transfer information within computing device 700, such as during start up, can be stored in the read only memory 708.

The computing device 700 also includes a secondary storage device 714 in some embodiments, such as a hard disk drive, for storing digital data. The secondary storage device 714 is connected to the system bus 706 by a secondary storage interface 716. The secondary storage device 714 and its associated computer readable media provide non-volatile and non-transitory storage of computer readable instructions (including application programs and program modules), data structures, and other data for the computing device 700.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 714 and/or system memory 704, including an operating system 718, one or more application programs 720, other program modules 722 (such as the software engines described herein), and program data 724. The computing device 700 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 700 through one or more input devices 726. Examples of input devices 726 include a keyboard 728, mouse 730, microphone 732 (e.g., for voice and/or other audio input), touch sensor 734 (such as a touchpad or touch sensitive display), and gesture sensor 735 (e.g., for gestural input). In some implementations, the input device(s) 726 provide detection based on presence, proximity, and/or motion. In some implementations, a user may walk into their home, and this may trigger an input into a processing device. For example, the input device(s) 726 may then facilitate an automated experience for the user. Other embodiments include other input devices 726. The input devices can be connected to the processing device 702 through an input/output interface 736 that is coupled to the system bus 706. These input devices 726 can be connected by any number of input/output interfaces, such as a parallel port, serial port, game port, or a universal serial bus. Wireless communication between input devices 726 and the input/output interface 736 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 738, such as a monitor, liquid crystal display device, light-emitting diode display device, projector, or touch sensitive display device, is also connected to the system bus 706 via an interface, such as a video adapter 740. In addition to the display device 738, the computing device 700 can include various other peripheral devices (not shown), such as speakers or a printer.

The computing device 700 can be connected to one or more networks through a network interface 742. The network interface 742 can provide for wired and/or wireless communication. In some implementations, the network interface 742 can include one or more antennas for transmitting and/or receiving wireless signals. When used in a local area networking environment or a wide area networking environment (such as the Internet), the network interface 742 can include an Ethernet interface. Other possible embodiments use other communication devices. For example, some embodiments of the computing device 700 include a modem for communicating across the network.

The computing device 700 can include at least some form of computer readable media. Computer readable media includes any available media that can be accessed by the computing device 700. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 700.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle display device comprising:
a housing forming an opening to an interior;
a first display module positioned in the interior of the housing, the display module including a first louver film that is stacked with a second louver film, wherein respective orientations of the first and second louver films are substantially perpendicular to each other; and
a cover glass that covers the opening to the interior of the housing, the cover glass being free floating and having an exposed glass edge;
wherein the vehicle display device has a shroud-less design and is configured for positioning within a distance from a vehicle window where the display module is susceptible to generating a reflection in the vehicle window, and wherein at least one of the first and second louver films reduce the reflection;
wherein the vehicle display device includes multiple display modules, and wherein a second display module of the multiple display modules includes the first louver film and does not include the second louver film.

2. The vehicle display device of claim 1, wherein the first display module is positioned nearest the vehicle window of the multiple display modules.

3. The vehicle display device of claim 1, wherein the multiple display modules include the first display module and second and third display modules, the first, second, and third display modules oriented side by side horizontally within the vehicle display device.

4. The vehicle display device of claim 1, wherein the first display module has first calibration settings and wherein the second display module has second calibration settings, wherein the first calibration settings are different from the second calibration settings.

5. The vehicle display device of claim 4, wherein the first calibration settings compensate brightness and color of the first display device compared to the second display device.

6. The vehicle display device of claim 1, wherein the vehicle window is a driver side window.

7. The vehicle display device of claim 6, wherein one of the first and second louver films is a vertical louver film.

8. The vehicle display device of claim 1, wherein the first display module includes a backlight module, and wherein the first and second louver films are included in the backlight module.

9. The vehicle display device of claim 8, wherein the backlight module includes a liquid crystal display (LCD) module and a light guide module, and wherein the first and second louver films are placed between the LCD module and the light guide module.

10. A vehicle display device comprising:
a housing forming an opening to an interior;
a first display module positioned in the interior of the housing, the display module including a first louver film that is stacked with a second louver film, wherein respective orientations of the first and second louver films are substantially perpendicular to each other, wherein the first display module further includes a backlight module, and wherein the first and second louver films are included in the backlight module, wherein the backlight module includes a liquid crystal display (LCD) module and a light guide module, and wherein the first and second louver films are placed between the LCD module and the light guide module; and
a cover glass that covers the opening to the interior of the housing, the cover glass being free floating and having an exposed glass edge;
wherein the vehicle display device has a shroud-less design and is configured for positioning within a distance from a vehicle window where the display module is susceptible to generating a reflection in the vehicle window, and wherein at least one of the first and second louver films reduce the reflection;
the vehicle display device further comprising a second display module that includes the first louver film and that does not include the second louver film.

11. The vehicle display device of claim 10, wherein first display module has first calibration settings and wherein the second display module has second calibration settings, wherein the first calibration settings are different from the second calibration settings.

12. The vehicle display device of claim 11, wherein the first calibration settings compensate brightness and color of the first display device compared to the second display device.

13. A vehicle display device comprising:
a housing forming an opening to an interior;
a first display module positioned in the interior of the housing;
a cover glass that covers the opening to the interior of the housing, the cover glass being free floating and having an exposed glass edge, wherein the vehicle display device has a shroud-less design, wherein the vehicle display device is configured for positioning within a distance from a side vehicle window where the display module is susceptible to generating a reflection in the side vehicle window, and wherein the vehicle display device is configured for positioning within a distance from a windshield where the display module is susceptible to generating a reflection in the windshield;
means for reducing the reflection in the side vehicle window and the reflection in the windshield, the means including a first louver film that is stacked with a second louver film, wherein respective orientations of the first and second louver films are substantially perpendicular to each other; and
a second display module positioned in the interior of the housing, wherein the second display module includes the first louver film and does not include the second louver film.

14. The vehicle display device of claim 13, wherein the first display module is positioned nearer the vehicle window than is the second display module.

15. The vehicle display device of claim 13, further comprising a third display module, the first, second, and third display modules oriented side by side horizontally within the vehicle display device.

16. The vehicle display device of claim 13, wherein the first display module has first calibration settings and wherein the second display module has second calibration settings, wherein the first calibration settings are different from the second calibration settings.

17. The vehicle display device of claim 16, wherein the first calibration settings compensate brightness and color of the first display device compared to the second display device.

18. The vehicle display device of claim 13, wherein the vehicle window is a driver side window.

19. The vehicle display device of claim 13, wherein one of the first and second louver films is a vertical louver film.

20. The vehicle display device of claim 13, wherein the first display module includes a backlight module, and wherein the first and second louver films are included in the backlight module.

* * * * *